US008523681B2

(12) United States Patent
Abiko (10) Patent No.: US 8,523,681 B2
(45) Date of Patent: Sep. 3, 2013

(54) CONTENT SERVER, CONTENT PROVIDING SYSTEM, AND CONTENT PROVIDING METHOD

(75) Inventor: Tsuyoshi Abiko, Saitama (JP)

(73) Assignee: Sony Corporation, Tokyo (JP)

( * ) Notice: Subject to any disclaimer, the term of this patent is extended or adjusted under 35 U.S.C. 154(b) by 78 days.

(21) Appl. No.: 13/048,324

(22) Filed: Mar. 15, 2011

(65) Prior Publication Data

US 2011/0237332 A1  Sep. 29, 2011

(30) Foreign Application Priority Data

Mar. 25, 2010 (JP) .................................. 2010-070756

(51) Int. Cl.
*G06F 17/00* (2006.01)

(52) U.S. Cl.
USPC ............................................................ 463/42

(58) Field of Classification Search
USPC ..................... 463/40–42; 709/203, 227, 229
See application file for complete search history.

(56) References Cited

U.S. PATENT DOCUMENTS

| 7,996,538 | B2 * | 8/2011 | Kikkawa et al. ............... 709/227 |
| 2005/0149557 | A1 * | 7/2005 | Moriya et al. ............. 707/104.1 |
| 2006/0036671 | A1 * | 2/2006 | Rhim et al. ................... 709/202 |
| 2006/0195545 | A1 * | 8/2006 | Kikkawa et al. .............. 709/217 |
| 2006/0242152 | A1 * | 10/2006 | Tanaka et al. ................... 707/10 |
| 2006/0294212 | A1 * | 12/2006 | Kikkawa et al. .............. 709/223 |
| 2007/0124796 | A1 * | 5/2007 | Wittkotter ...................... 725/136 |
| 2010/0192173 | A1 * | 7/2010 | Mizuki et al. ................... 725/25 |
| 2012/0150948 | A1 * | 6/2012 | Ban .............................. 709/203 |

FOREIGN PATENT DOCUMENTS

JP 2000-157719 6/2000

* cited by examiner

*Primary Examiner* — Ronald Laneau
(74) *Attorney, Agent, or Firm* — Oblon, Spivak, McClelland, Maier & Neustadt, L.L.P.

(57) ABSTRACT

There is provided a content server including a reception unit for receiving metadata described with an execution state of a content executed in a first device connected through a network and identification information for identifying the first device through the network, as necessary, a content storage unit for storing a content regarding content of the metadata described with the execution state of the content executed in the first device, a content extracting unit for extracting the content regarding the content of the metadata described with the execution state of the content executed in the first device received by the reception unit from the content storage unit, as necessary, according to the reception at the reception unit, and a transmission unit for transmitting, as necessary, the content extracted from the content storage unit by the content extracting unit, as necessary, to a second device associated with the first device by the identification information through the network.

14 Claims, 9 Drawing Sheets

CONTENT SERVER, CONTENT PROVIDING SYSTEM, AND CONTENT PROVIDING METHOD

BACKGROUND OF THE INVENTION

1. Field of the Invention

The present invention relates to a content server, a content providing system, and a content providing method.

2. Description of the Related Art

In games that can be played on a home game machine, the contents are often complicated and the time until beat is long due to enhancement in the performance of the home game machine and enhancement in the capacity of the recorded medium on which the program is recorded. Books and magazines commenting on the game are published for such games, so that the user can look at the walk-through information described in the books and magazines to get some hints when stuck at the game to proceed and play the game.

In particular, the needs for such walk-through information are increasing with change in the living style of the users who play the game. For instance, in games of the category that needs great amount of time for beat such as roll playing game, the map tends to become complicated or the number of items tends to increase, and thus information on such maps and items are very advantageous for users who do not have time to comb through the map or collect the items.

SUMMARY OF THE INVENTION

However, the contents are complicated and the time until beat is longer in recent games, as described above. Accompanied therewith, the amount of walk-through information is getting very large such as the quantity of the walk-through books in which the walk-through information are described is increasing. Therefore, the users playing the game may hesitate to purchase the book describing the walk-through information of the game, or even if the user purchases the book, the access to the walk-through information corresponding to his/her progress extent is becoming harder. It is thus advantageous if the walk-through information corresponding to his/her progress extent can be easily looked at hand.

Japanese Patent Application Laid-Open No. 11-179050 discloses a technique of displaying the walk-through information on a screen according to the execution state of the game. Japanese Patent Application Laid-Open No. 2000-157719 discloses a technique of arranging a display unit on a controller, and displaying information related to the game on the display unit of the controller used by another user playing the same game according to the operation of the controller by a user.

In such techniques, the walk-through information are stored in the recording medium along with the program of the game, and such walk-through information are created in advance at the time point the game is created. Therefore, the information does not have flexibility since the walk-through information is provided unilaterally from the manufacturing company that created the game. It is hard for the user to enjoy the game from many directions if the user who plays the game plays the game based on such unilaterally provided information.

In light of the foregoing, it is desirable to provide a novel and improved content server, content providing system, and content providing method capable of easily providing information desired by the user and also providing a multidirectional way of enjoying by automatically providing information corresponding to the execution state of the content.

According to an embodiment of the present invention, there is provided a content server including a reception unit for receiving metadata described with an execution state of a content executed in a first device connected through a network and identification information for identifying the first device through the network, as necessary, a content storage unit for storing a content regarding content of the metadata described with the execution state of the content executed in the first device, a content extracting unit for extracting the content regarding the content of the metadata described with the execution state of the content executed in the first device received by the reception unit from the content storage unit, as necessary, according to the reception at the reception unit, and a transmission unit for transmitting, as necessary, the content extracted from the content storage unit by the content extracting unit, as necessary, to a second device associated with the first device by the identification information through the network.

The content executed in the first device may be a game content, and the content extracting unit may extract the content corresponding to the execution state of the game content executed in the first device from the content storage unit according to the reception, as necessary.

The content extracting unit may extract walk-through information of the game content corresponding to the execution state of the game content executed in the first device from the content storage unit, as necessary.

The content extracting unit may extract a bulletin board corresponding to the execution state of the game content executed in the first device from the content storage unit, as necessary.

The content extracting unit may extract the content in view of real date and time when extracting the content from the content storage unit.

The reception unit may receive an input result with respect to the content transmitted by the transmission unit to the second device, and the transmission unit may transfer the input result received by the reception unit from the second device to the first device.

The identification information received by the reception unit may be a user account. The first device and the second device may be associated using the user account.

The content extracting unit may check payment of a user corresponding to the identification information if the content to extract is a charged content when extracting the content from the content storage unit.

According to another embodiment of the present invention, there is provided a content providing system including a content server for providing contents, a first device connected to the content server through a network by predetermined identification information, and a second device connected to the content server through the network by predetermined identification same as the first device. The first device includes a content executing unit for executing the content, and a communication unit for transmitting metadata described with an execution state of the content to be executed by the content executing unit to the content server. The content server includes a reception unit for receiving the metadata described with the execution state of the content executed in the first device and the predetermined identification information held in the first device through the network, as necessary, a content storage unit for storing a content regarding content of the metadata described with the execution state of the content executed in the first device, a content extracting unit for extracting the content regarding the content of the metadata described with the execution state of the content executed in the first device received by the reception unit from the content storage unit, as necessary, according to the reception of the reception unit, and a transmission unit for transmitting, as necessary, the content extracted from the content storage unit by the content extracting unit, as necessary, to the second device having predetermined identification information same as the predetermined identification information received by the reception unit from the first device through the network. The second device includes a communication unit for receiving the content transmitted from the transmission unit, and a display unit for displaying the content received by the communication unit.

The first device may execute a game content, and the second device may include a keyboard for an input device.

According to another embodiment of the present invention, there is provided a content providing method including the steps of receiving metadata described with an execution state of a content executed in a first device connected through a network and predetermined identification information held in the first device through the network, as necessary, extracting a content regarding content of the metadata described with the execution state of the content executed in the first device received in the receiving step from a content storage unit storing the content regarding the content of the metadata described with the execution state of the content executed in the first device, as necessary, according to the reception at a reception unit, and transmitting, as necessary, the content extracted from the content storage unit in the content extracting step, as necessary, to a second device having predetermined identification information same as the predetermined identification information received from the first device in the receiving step through the network.

According to the embodiments of the present invention described above, there is provided a new and improved content server, content providing system, and content providing method capable of providing a multidirectional way of enjoying by automatically providing information corresponding to the execution state of the content.

DETAILED DESCRIPTION OF THE EMBODIMENT

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
<1. One Embodiment of Present Invention>
[1-1. Configuration of Content Providing System]
[1-2. Configuration of Information Processing Device]
[1-3. Configuration of Content Providing Server]
[1-4. Configuration of Personal Computer]
[1-5. Operation of Content Providing System]
[1-6. Variant of Information Providing Process]
<2. Conclusion>
<1. One Embodiment of Present Invention>
[1-1. Configuration of Content Providing System]

Figure 1:
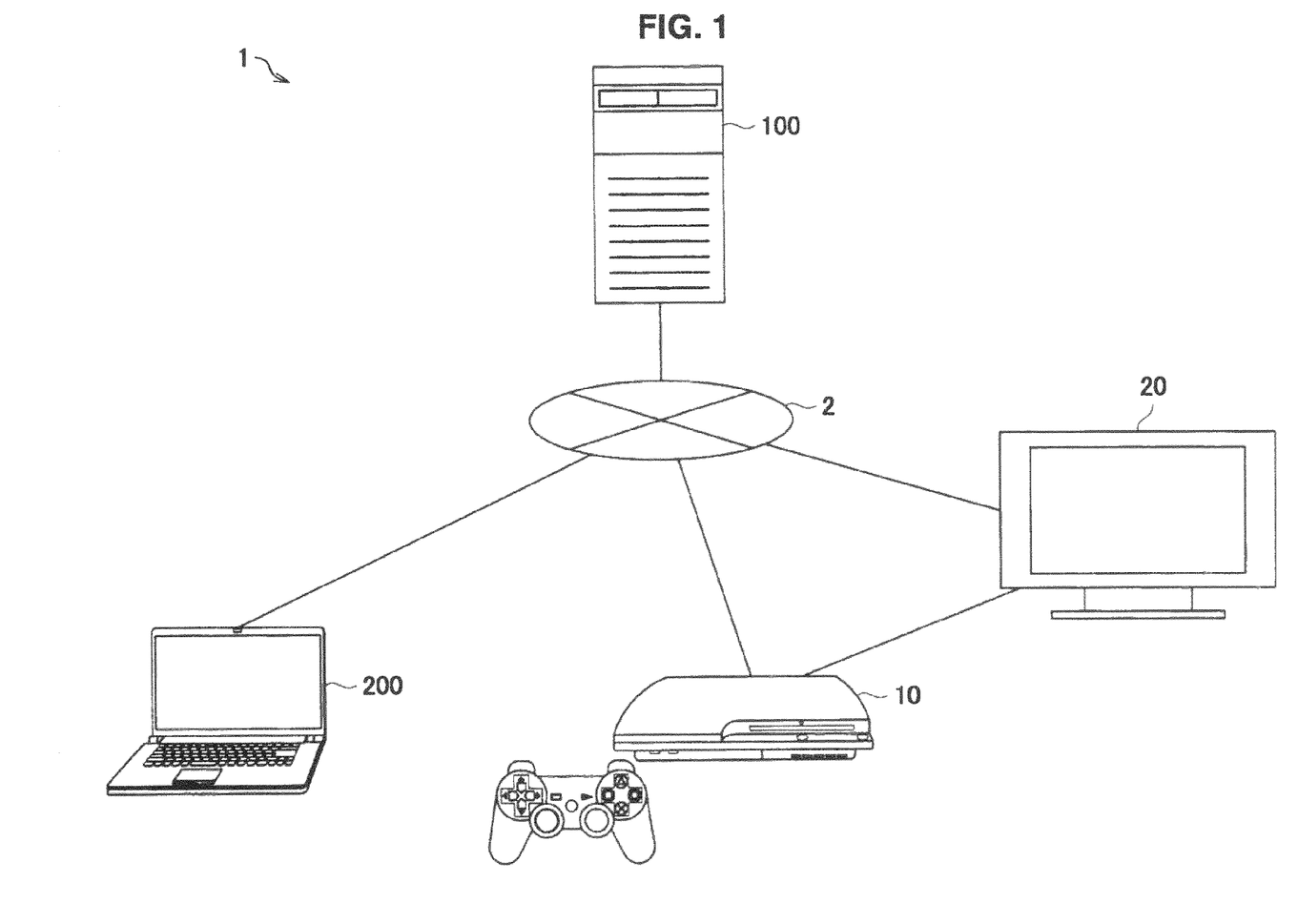
FIG. 1 is an explanatory view showing a configuration of a content providing system 1 according to one embodiment of the present invention.

First the configuration of a content providing system according to one embodiment of the present invention will be described. FIG. 1 is an explanatory view showing a configuration of a content providing system 1 according to one embodiment of the present invention.

As shown in FIG. 1, the content providing system 1 according to one embodiment of the present invention is configured to include an information processing device 10, a display device 20, a content providing server 100, and a personal computer 200.

The information processing device 10 has a function of reading out and executing a program from a recording medium, on which the program of the game content is recorded, and displaying the execution result on the display device 20, or reading out a video content from a recording medium, on which the video content is recorded, and displaying on the display device 20.

The information processing device 10 is connected to the content providing server 100 through a bidirectional network 2 such as the Internet. The information processing device 10 provides information (metadata) described with the execution state of the game content being executed to the content providing server 100 through the network 2. Thus, the content providing server 100 can provide the information corresponding to the execution state of the game content.

The display device 20 displays various types of processing results in the information processing device 10. The information processing device 10 and the display device 20 are connected with an HDMI (High-Definition Multimedia Interface) cable and the like. The various types of processing results in the information processing device 10 are transmitted to the display device 20 through the HDMI cable, and displayed on the display device 20.

The content providing server 100 receives the information (metadata) described with the execution state of the game content being executed in the information processing device 10 provided from the information processing device 10 through the network 2, and extracts and provides the information (e.g., walk-through information of the game) corresponding to the relevant metadata. In the present embodiment, the content providing server 100 provides the extracted information to a device different from the information processing device 10 such as the personal computer 200 associated with the information processing deice 10 as necessary. The personal computer 200 displays the information provided from the content providing server 100 on a screen.

When the information is provided from the content providing server 100 in such manner, the user executing the game content on the information processing device 10 can get hints to proceed the game being executed by looking at the information displayed on the personal computer 200 according to the execution state of the game content or can participate in an even related to the game being executed.

The personal computer 200 is a computer for executing various information processing, where the personal computer 200 has a function of displaying the information corresponding to the execution state of the game content being executed in the information processing device 10 provided from the content providing server 100 as necessary in the present embodiment. Thus, the user executing the game content on the information processing device 10 can acquire the information corresponding to the execution state of the game content with the personal computer 200 as necessary.

The configuration of the content providing system 1 according to one embodiment of the present invention has been described above. Now, the configuration of the information processing device 10 according to one embodiment of the present invention will be described.

[1-2. Configuration of Information Processing Device]

Figure 2:
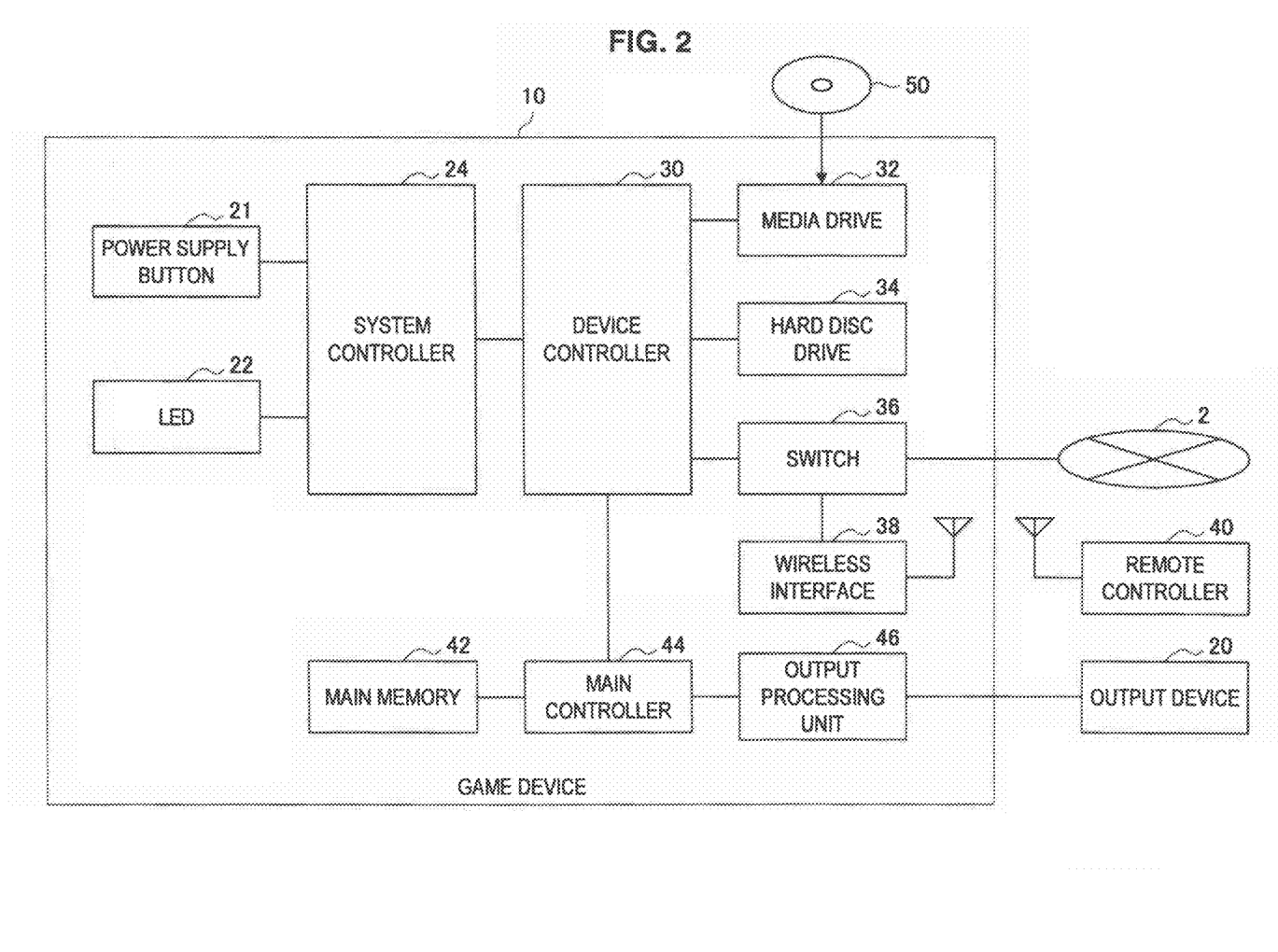
FIG. 2 is an explanatory view showing the configuration of the information processing device 10 according to one embodiment of the present invention.

FIG. 2 is an explanatory view showing the configuration of the information processing device 10 according to one embodiment of the present invention. The configuration of the information processing device 10 according to one embodiment of the present invention will be described below using FIG. 2.

As shown in FIG. 2, the information processing device 10 according to one embodiment of the present invention is configured to include a power supply button 21, an LED 22, a system controller 24, a device controller 30, a media drive 32, a hard disc drive 34, a switch 36, a wireless interface 38, a main controller 44, a main memory 42, and an output processing unit 46.

The power supply button 21 is an input unit where the input of operation from the user is to be made, and is operated to turn ON or turn OFF the power supply to the information processing device 10. The LED 22 is lighted on/off to display the state of power ON or OFF. The system controller 24 detects the pushed state or the non-pushed state of the power supply button 21, and activates the main controller 44 when detecting the state transition from the state of power OFF to the pushed state to boot the boot sequence of the operating system and lighting control the LED 22. If a power supply cable is inserted to the information processing device 10, the system controller 24 maintains the standby mode even if in the power OFF state and monitors the pushing the power supply button 21.

The device controller 30 is configured as an LSI (Large-Scale Integrated Circuit) for executing the exchange of information between the devices as if a south bridge. As shown in the figure, the device controller 30 is connected with devices such as the system controller 24, the media drive 32, the hard disc drive 34, the switch 36, and the main controller 44. The device controller 30 absorbs the difference in electrical characteristics and the difference in data transfer speed of each device, and controls the timing of data transfer. The hard disc derive 34 drives the built-in hard disc to perform write/read of data. The built-in hard disc functions as a storage device for storing data. The media drive 32 is a drive device for recognizing a recording medium 50 by driving the same and reading out the necessary data from the recording medium when the read-only recording medium 50 is attached. The recording medium 50 may be a medium such as an optical disc or a magneto optical disc.

The switch 36 is an Ethernet switch (Ethernet is registered trademark), and is a device that connects with an external device by wire or wirelessly to transmit and receive data. The switch 36 receives content files, license files, and key files from a content distribution server 18 through the network 16. The switch 36 also connects to a wireless interface 38, and the wireless interface 38 connects to the remote controller 40 through a wireless communication protocol such as the Bluetooth (Registered trademark) protocol and the IEEE 802.11 protocol. The operation information of the user input to the remote controller 40 is thus provided to the main controller 44 through the wireless interface 38, the switch 36, and the device controller 30.

The main controller 44 includes a multi-core CPU, and one versatile processor core and a plurality of simple processor cores in one CPU. The versatile processor core is called a PPU (Power Processing Unit), and the remaining processor cores are called a SPU (Synergistic-Processing Unit). The operating system (hereinafter simply referred to as "OS") for providing the functions and the environment for efficiently using the information processing device 10, and comprehensively controlling the entire device is executed in the main controller 44. The OS layer of the information processing device 10 in the present example includes three layers of user layer, kernel layer, and hypervisor layer, from the upper layer, where the software of the user layer, the kernel layer and the hypervisor layer are integrated to function as the "OS" of the information processing device 10.

When the power is turned ON by the power supply button 21, the system controller 24 supplies power to the main controller 44 and the output processing unit 46 via the device controller 30. When the power is supplied to the main controller 44, the PPU first executes the boot loader of the OS to activate the hypervisor layer. The PPU then activates the kernel layer of the OS and further activates the user layer to prepare for the reception of the data provided from the hard disc drive 34 or the recording medium 50.

The main controller 44 includes a memory controller to be connected to the main memory 42. The PPU includes a register and includes a main processor as a main body for executing the calculation to efficiently assign the task serving as a basic processing unit in the application to execute to each SPU. The PPU itself may execute the task. The SPU includes a register and includes a sub-processor serving as a main body for executing the calculation and a local memory serving as a local storage region. The main memory 42 and the local memory are configured as a RAM (Random Access Memory). The SPU includes a dedicated DMA (Direct Memory Access) controller for the control unit, and performs data transfer between the main memory 42 and the local memory so that the data can be stream processed at high speed and high speed data transfer can be realized between the frame memory incorporated in the output processing unit 46 and the local memory.

The output processing unit 46 is connected to the display device 20, and outputs video signals and audio signals, which are the processing results of the application. The output processing unit 46 includes a GPU (Graphics Processing Unit) for realizing the image processing function. The GPU may adopt an HDMI (High Definition Multimedia Interface).

In the information processing device 10 of the present example, various contents such as video contents, music contents, and game contents are stored in the hard disc drive 34. Such contents may be downloaded from the content distribution server 18, or may be installed from the recording medium 50. Such content files are classified by folders in the hard disc drive 34.

Figure 3:
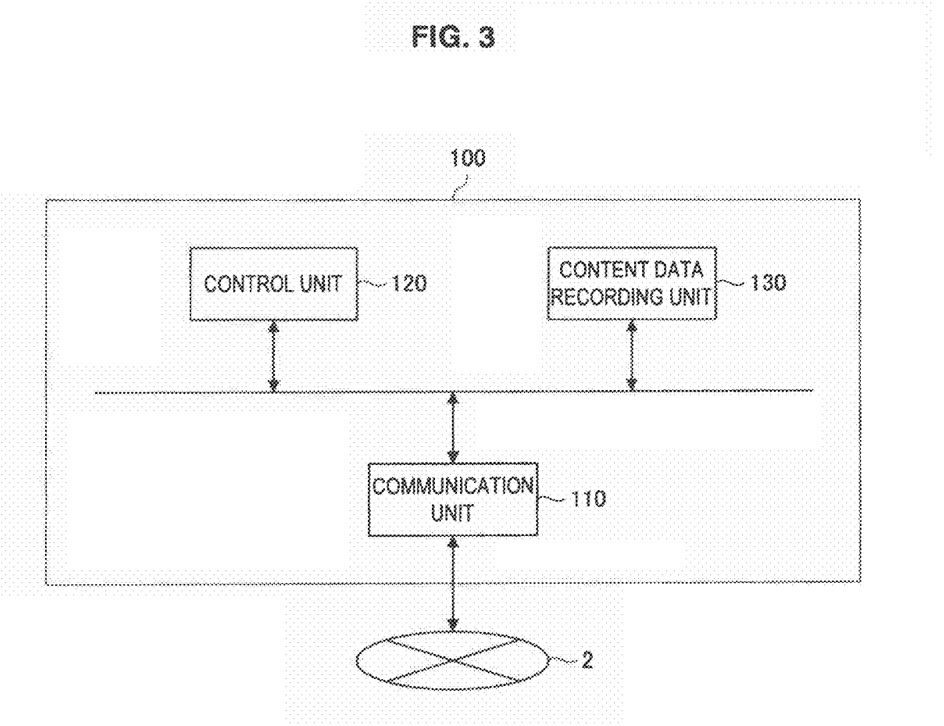
FIG. 3 is an explanatory view showing the configuration of the content providing server 100 according to one embodiment of the present invention.

The configuration of the information processing device 10 according to one embodiment of the present invention has been described above using FIG. 2. Now, the configuration of the content providing server 100 according to one embodiment of the present invention will be described.

[1-3. Configuration of Content Providing Server]

FIG. 3 is an explanatory view showing the configuration of the content providing server 100 according to one embodiment of the present invention. The configuration of the content providing server 100 according to one embodiment of the present invention will be described below using FIG. 3.

As shown in FIG. 3, the content providing server 100 according to one embodiment of the present invention is configured to include a communication unit 110, a control unit 120, and a content data recording unit 130.

The communication unit 110 intermediates the communication between the content providing server 100 and the information processing device 10, the display device 20, and the personal computer 200 connected through the network 2. For instance, when the information described with the execution state of the game content being executed in the information processing device 10 is transmitted from the information processing device 10 to the content providing server 100, the communication unit 110 receives the information and sends it to the control unit 120. When transmitting the information extracted by the control unit 120 from the content data recording unit 130 based on the information transmitted from the information processing device 10 to the personal computer 200 associated with the information processing device 10, the communication unit 110 receives the information and sends it to the network 2.

The control unit 120 controls the operation of the content providing server 100. For instance, when the information the information described with the execution state of the game content being executed in the information processing device 10 is transmitted from the information processing device 10 connected with the content providing server 100 through the network 2, the control unit 120 extracts the information related to the execution state from the content data recording unit 130 using such information. The control unit 120 sends the extracted information to the communication unit 110 to transmit it to the personal computer 200 associated with the information processing device 10.

The information extracted by the control unit 120 includes hints (walk-through information) for proceeding the game content being executed on the information processing device 10. The information described with the execution state of the game content includes information on the current location in the map for the game and the progress status of the story in the game if the game content being executed on the information processing device 10 is a roll playing game (RPG), and information on the stage the user of the information processing device 10 is currently playing if the game content is an action game. When such information is transmitted from the information processing device 10, the control unit 120 extracts the information corresponding to such information and status from the content data recording unit 130 based on the information. The information the control unit 120 extracts from the content data recording unit 130 includes information on the map of the spot (dungeon, tower etc.) to advance into, the items that can be acquired, and the opponent character to defeat if the game content is the roll playing game, and walk-through route, walk-through method, and the like of the stage to capture if the game content is the action game.

The content data recording unit 130 stores various types of information regarding the game content executed on the information processing device 10. The content data recording unit 130 records various types of information regarding the game content executed on the information processing device 10 so as to be extractable according to the execution state of the game content being executed on the information processing device 10. The content data recording unit 130 may store, as the relevant information, the walk-through information that may become a hint in proceeding with the game content executed on the information processing device 10, and the information on the even related to the game content executed on the information processing device 10. The information stored in the content data recording unit 130 is extracted by the control unit 120 as necessary, and transmitted to the personal computer 200 associated with the information processing device 10 by the communication unit 110.

The timing of storing various types of information related to the game content executed in the information processing device 10 in the content data recording unit 130 may be before the game content is released and distributed to the market, or may be after some time after the release of the game content. The content data recording unit 130 may store different information depending on the time even if related to the same game content. With the content server 100 configured in such manner, the information to store in the content data recording unit 130 and the timing to store the information become more flexible, and the user who receives the information from the content server 100 can multi-directionally enjoy the game content.

The information to be recorded in the content data recording unit 130 may be described in the HTML (HyperText Markup Language) format, may be still image or moving image, or may be created based on the standard for handling other images, and the like.

With the content providing server 100 configured in such manner, the information related to the game content being executed in the information processing device 10 connected to the content providing server 100 through the network 2 can be provided to the personal computer 200 associated with the information processing device 10.

Figure 4:
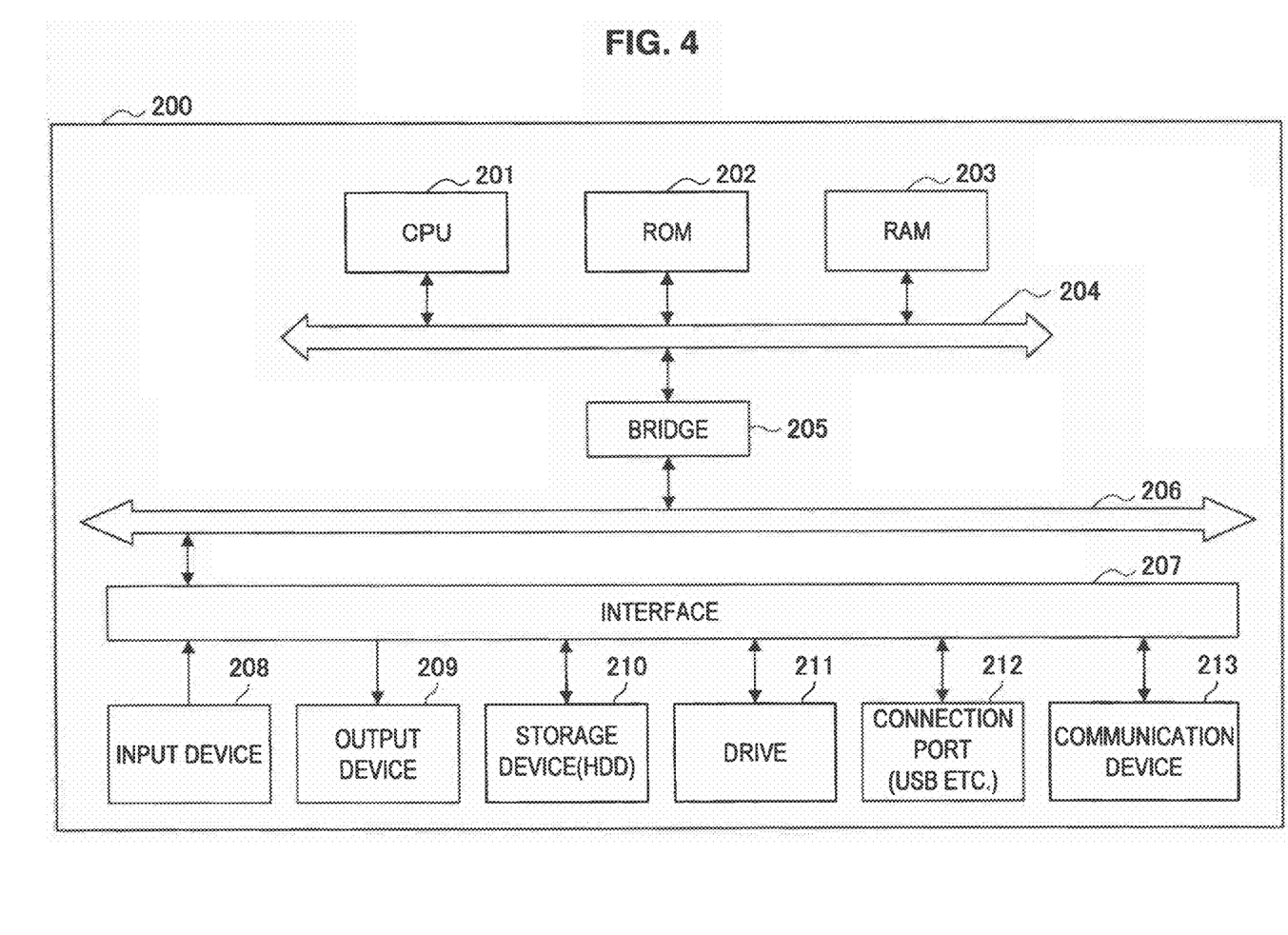
FIG. 4 is an explanatory view showing the configuration of the personal computer 200 according to one embodiment of the present invention.

The configuration of the content providing server 100 according to one embodiment of the present invention has been described using FIG. 3. In the present embodiment, the configuration in which the content data recording unit 130 is arranged inside the content providing server 100 is adopted, but the present invention is not limited to such example, and the configuration in which the content data recording unit 130 is arranged in a device different from the content providing server 100 may be adopted. The configuration of the personal computer 200 according to one embodiment of the present invention will now be described.

[1-4. Configuration of Personal Computer]

FIG. 4 is an explanatory view showing the configuration of the personal computer 200 according to one embodiment of the present invention. The configuration of the personal computer 200 according to one embodiment of the present invention will be described below using FIG. 4.

As shown in FIG. 4, the personal computer 200 according to one embodiment of the present invention includes a CPU (Central Processing Unit) 201, a ROM (Read Only Memory) 202, a RAM (Random Access Memory) 203, buses 204, 206, a bridge 205, an interface 207, an input device 208, an output device 209, other storage device 210 such as the HDD, a drive 211, other connection port 212 such as the USB, a communication device 213, and the like. Each of such configuration are mutually connected such that the information can be transmitted through the bus 204 and the bus 206 connected by the bridge 205, the interface 907, and the like.

The program can be recorded in the storage device 210 such as a HDD (Hard Disk Drive) and a SSD (Solid State Drive), which is an example of the recording device, the ROM 202, the RAM 203, and the like.

The program can be temporarily or permanently recorded in a removable storage medium (not shown) including a magnetic disc such as a flexible disc, an optical disc such as various types of CD (Compact Disc), MO (Magneto Optical) disc, and DVD (Digital Versatile Disc), and a semiconductor memory. Such removable storage medium can be provided as a so-called package software. The program recorded in such removable storage medium may be read out by the drive 211, and recorded in the recording device through the interface 207, the buses 204, 206, and the like.

Furthermore, the program can be recorded in the download site, other computers, other recording devices, and the like (not shown). In this case, the program is transferred through the network (not shown) such as the LAN (Local Area Network) and the Internet, and the program is received by the communication device 913. The program may be transferred to other recording devices, communication devices, and the like connected to the connection port 212 such as the USB (Universal Serial Bus). The program received by the communication device 213 or the connection port 912 may be recorded in the recording device through the interface 207, the buses 204, 206, and the like.

The series of processes are realized when the CPU 201 executes various types of processes according to the program recorded in the recording device. In this case, the CPU 201 may directly read out the program from the recording device and execute the same, or may execute the program after once loading the program in the RAM 203. Furthermore, when receiving the program through the communication device 213 and the drive 211, the CPU 201 may directly execute the received program without recording the same in the recording device.

The CPU 201 may perform various types of processes based on signals and information input from the input device 208 such as the mouse, the keyboard, the microphone (not shown), and the like, other input devices connected to the connection port 212, and the like, as necessary.

The CPU 201 may output the result of executing the series of processes from the output device 209 such as a display device including a monitor, and the like, and an audio output device including a speaker, a headphone, and the like. The CPU 201 may transmit the processing result from the communication device 213 and the connection port 212, or may record the processing result in the recording device or the removable storage medium, as necessary.

The personal computer 200 having the relevant configuration is associated in advance with the information processing device 10 in the content providing server 100 connected through the network 2, so that the information related to the game content being executed in the information processing device 10 can be provided. The content providing system 1 according to the present embodiment can reflect the process executed in the personal computer 200 on the game content being executed in the information processing device 10 when the personal computer 200 executes the process on the information provided from the content providing server 100.

The configuration of the personal computer 200 according to one embodiment of the present invention has been described above using FIG. 4. The operation of the content providing system 1 according to one embodiment of the present invention will now be described.

[1-5. Operation of Content Providing System]

[1-5-1. Associating Information Processing Device and Personal Computer]

Figure 5:
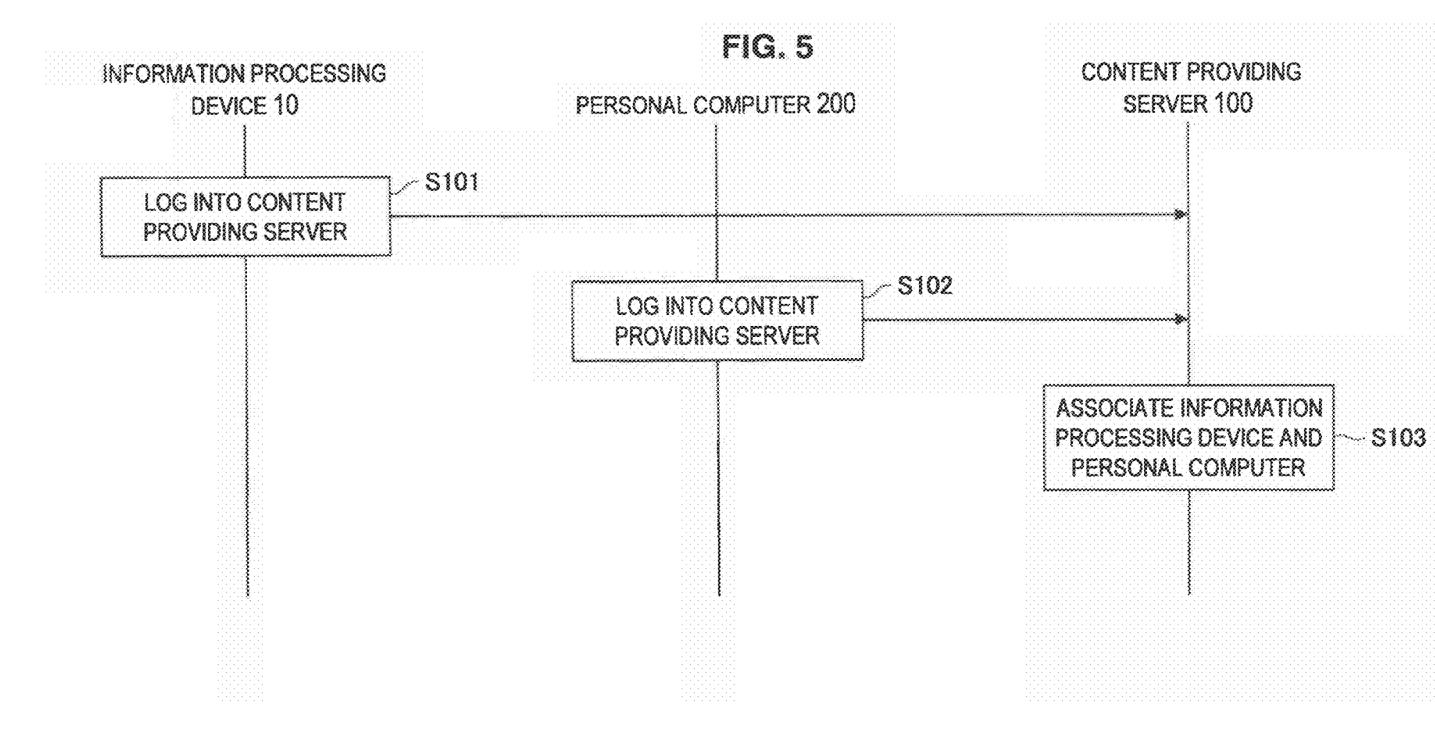
FIG. 5 is a flowchart showing the operation of the content providing system 1 according to one embodiment of the present invention.

First, the process for associating the information processing device 10 and the personal computer 200 with the content providing server 100 will now be described. FIG. 5 is a flowchart showing the operation of the content providing system 1 according to one embodiment of the present invention, and shows the process for associating the information processing device 10 and the personal computer 200 with the content providing server 100.

First, the information processing device 10 logs into the content providing server 100 at an arbitrary timing in advance (step S101). The log in process from the information processing device 10 to the content providing server 100 is executed by the main controller 44 based on the operation of the remote controller 40 of the user. The timing of log in from the information processing device 10 to the content providing server 100 is not particularly limited, but the information processing device 10 desirably logs into the content providing server 100 in advance before the execution or at the time of execution of the game content of which information is desirably provided from the content providing server 100. A login ID acquired in advance and a password set to log in with the login ID are used to log into the content providing server 100. The login ID is an example of identification information of the present invention, where the login ID and the password may be input by the user of the information processing device 10 for every login to the content providing server 100, or that saved inside the information processing device 10 (e.g., hard disc drive 34, etc.) in advance may be used.

The personal computer 200 also logs into the content providing server 100 at an arbitrary timing in advance (step S102). The log in from the personal computer 200 to the content providing server 100 is similarly executed by the CPU 201 based on the operation of the input device 208 from the user. The timing of log in from the personal computer 200 to the content providing server 100 is not particularly limited, but the personal computer 200 desirably logs into the content providing server 100 in advance before the execution or at the time of execution of the game content of which information is desirably provided from the content providing server 100.

The login ID and the password used for login from the personal computer 200 to the content providing server 100 are the same as the login ID and the password used by the information processing device 10 to log into the content providing server 100 in step S101. The content providing server 100 thus can associate the information processing device 10 and the personal computer 200.

When logging in from the personal computer 200 to the content providing server 100, the versatile software such as the web browser may be executed on the personal computer 200 to access the content providing server 100 with the versatile software, or the software specialized for receiving the provision of information from the content providing server 100 may be executed on the personal computer 200 to access the content providing server 100 with the relevant software.

When logged in from both the information processing device 10 and the personal computer 200 with the same login ID, the content providing server 100 associates the information processing device 10 and the personal computer 200 that logged in with the same login ID (step S103). The association of the information processing device 10 and the personal computer 200 is executed by the control unit 120, and the like. The content providing server 100 can provide the information corresponding to the execution state of the game content executed on the information processing device 10 to the personal computer 200 by associating the information processing device 10 and the personal computer 200 logged in with the same login ID.

The process for associating the information processing device 10 and the personal computer 200 with the content providing server 100 has been described above using FIG. 5.

[1-5-2. Information Provision from Content Providing Server]

Figure 6:
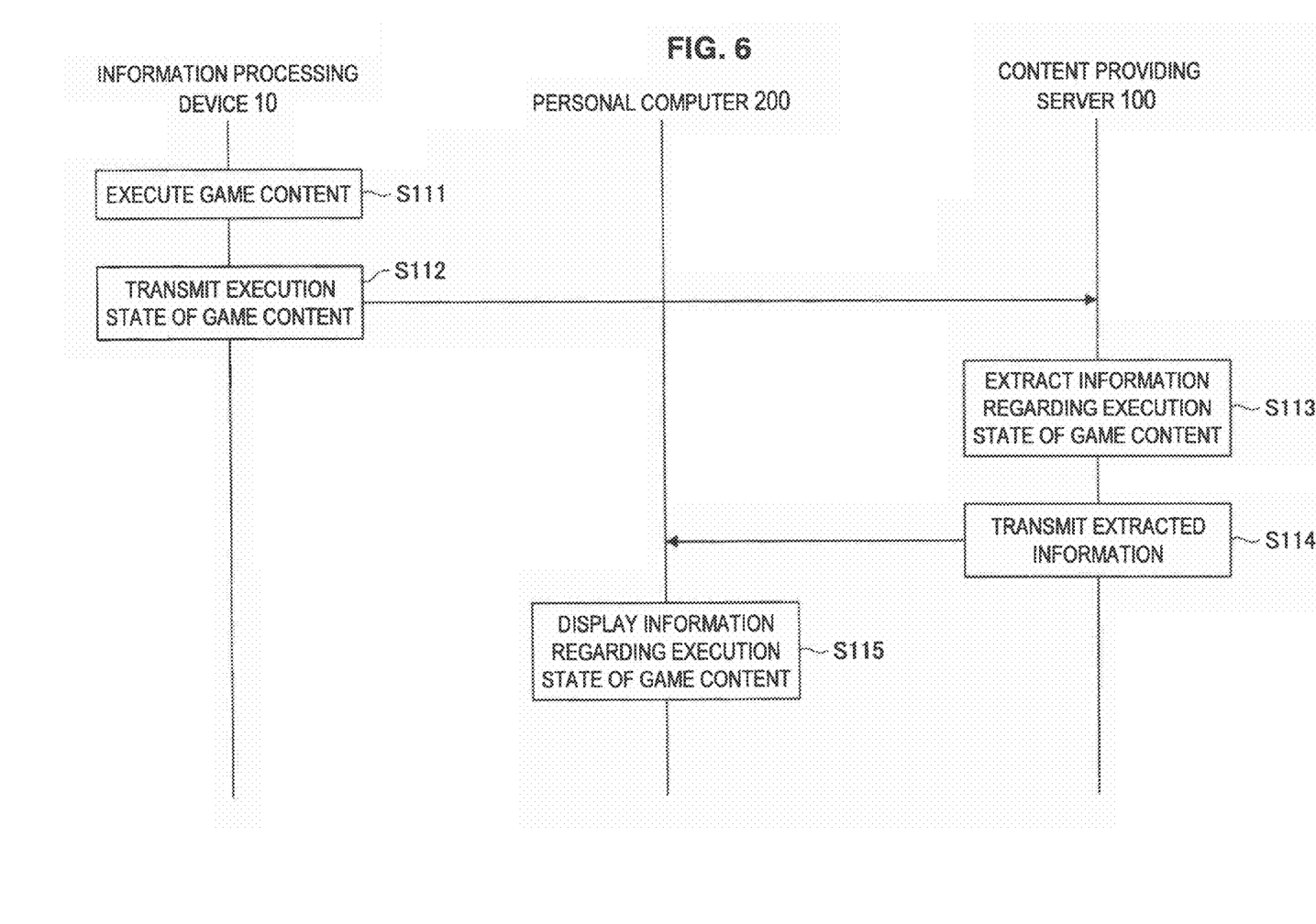
FIG. 6 is a flowchart showing the operation of the content providing system 1 according to one embodiment of the present invention.

The information providing process from the content providing server 100 will now be described. FIG. 6 is a flowchart showing the operation of the content providing system 1 according to one embodiment of the present invention, and shows the process of providing the information corresponding to the execution state of the game content executed on the information processing device 10 to the personal computer 200.

The information processing device 10 executes the game content stored in the hard disc drive 34 or the recording medium 50 (step S111). The execution of the game content is carried out by the main controller 44. The information processing device 10 transmits the execution state of the game content being executed from the switch 36 to the content providing server 100, as necessary, while executing the game content (step S112).

The execution state of the game content is transmitted, as necessary, from the information processing device 10 to the content providing server 100 as metadata. The metadata may be saved in the hard disc drive 34 or the recording medium 50 in advance, or may be generated according to the execution state of the game content when the main controller 44 analyzes the execution state of the game content. The metadata may contain various information, but at least includes information for uniquely identifying the game content being executed on the information processing device 10 and the execution state of the game content. As described above, if the game content being executed on the information processing device 10 is a roll playing game (RPG), the information on the current location on the map of the game and the progress status of the story in the game are transmitted, as necessary, from the switch 36 of the information processing device 10 to the content providing server 100 through the network 2. If the game content being executed on the information processing device 10 is an action game, the information on the stage the user of the information processing device 10 is currently playing is transmitted, as necessary, from the switch 36 of the information processing device 10 to the content providing server 100 through the network 2.

When receiving the information described with the execution state of the game content being executed on the information processing device 10 from the information processing device 10, the content providing server 100 extracts the information related to the execution state in the information processing device 10 from the content recording unit 130 with the received information as the key with the control unit 120 (step S113). As described above, the information the control unit 120 extracts from the content data recording unit 130 includes information on the map of the spot (dungeon, tower etc.) to advance into, the items that can be acquired, and the opponent character to defeat if the game content being executed on the information processing unit 10 is the roll playing game, and walk-through route, walk-through method, and the like of the stage to capture if the game content is the action game.

The process executed by the control unit 120 will be described using a more specific example. Assume that the game content being executed on the information processing device 10 is the roll playing game and the user of the information processing device 10 operates the character of the game to enter the character into a certain dungeon (dungeon A). The information processing device 10 then transmits to the content providing server 100 that the character is currently in the dungeon A. When receiving with the communication unit 110 that the character is currently in the dungeon A, the content providing server 100 has the control unit 120 extract the information related to the dungeon A from the content recording unit 130. The information related to the dungeon A extracted by the control unit 120 may include the map of the dungeon A, the item that can be acquired in the dungeon A as well as the position of the item, the opponent monster and the boss character that appears in the dungeon A, and the like.

Assume that the user of the information processing device 10 thereafter proceeds with the game and enters the character into a different dungeon (dungeon B). The information processing device 10 then transmits to the content providing server 100 that the character is currently in the dungeon B. When receiving with the communication unit 110 that the character is currently in the dungeon B, the content providing server 100 has the control unit 120 extract the information related to the dungeon B from the content recording unit 130 as opposed to the above case. The information related to the dungeon B extracted by the control unit 120 may include the map of the dungeon B, the item that can be acquired in the dungeon B as well as the position of the item, the opponent monster and the boss character that appears in the dungeon B, and the like, similar to the above.

When the information corresponding to the execution state of the game content being executed on the information processing device 10 is extracted from the content data recording unit 130, the information corresponding to the execution state of the game content can be automatically provided, and the user playing the game content on the information processing device 10 can easily acquire the information advantageous to the progression of the game content. Furthermore, the content ahead (story, map, appearing character, etc.) of the game content are prevented from being known by the user by extracting the information corresponding to the execution state of the game content.

When the game content being executed on the information processing device 10 is the roll playing game, the information the control unit 120 extracts from the content data recording unit 130 is not limited to the information that becomes a hint in the progression of the game. For instance, the control unit 120 may extract a bulletin board in which the users in a similar execution state can interact from the content data recording unit 130. In the example described above, if the user of the information processing device 10 is trying to walk through the dungeon A from now, the control unit 120 extracts the bulletin board, in which only the user also trying to walk through the dungeon A can browse through or write, from the content recording unit 130 as the content. The interaction of the users playing in the similar scene can be expected by extracting the bulletin board from the content data recording unit 130 and providing the same to the personal computer 200.

The control unit 120 may extract the advertisement information suited for the executions state of the game content and the opening information of an event related to the game content from the content data recording unit 130, and provide the same to the personal computer 200.

Assume that the game content being executed on the information processing device 10 is a golf game. The information processing device 10 transmits the information of the course and the cup the user is currently playing in the golf game to the content providing server 100. When receiving with the communication unit 110 the information on the course and the cup played in the golf game being executed on the information processing device 10, the content providing server 100 has the control unit 120 extract the information regarding the course and the cup from the content data recording unit 130. The information regarding the course and the cup extracted by the control unit 120 may include the layout of the cup and the recommended way of overcoming such cup.

The information extracted from the content data recording unit 130 as the information regarding the execution state of the game content is appropriately selected according to the category of the game content being executed on the information processing device 10.

When the control unit 120 extracts the information related to the execution state from the content data recording unit 130 in step S113, the extracted information is transmitted from the communication unit 110 to the personal computer 200 associated with the information processing device 10 (step S114). The personal computer 200 displays the information transmitted from the content providing server 100 (step S115). The browser for browsing the web site on the Internet and other versatile software may be used or a dedicated software for displaying the information transmitted from the content providing server 100 may be used to display the information transmitted from the content providing server 100 on the personal computer 200.

Figure 7:
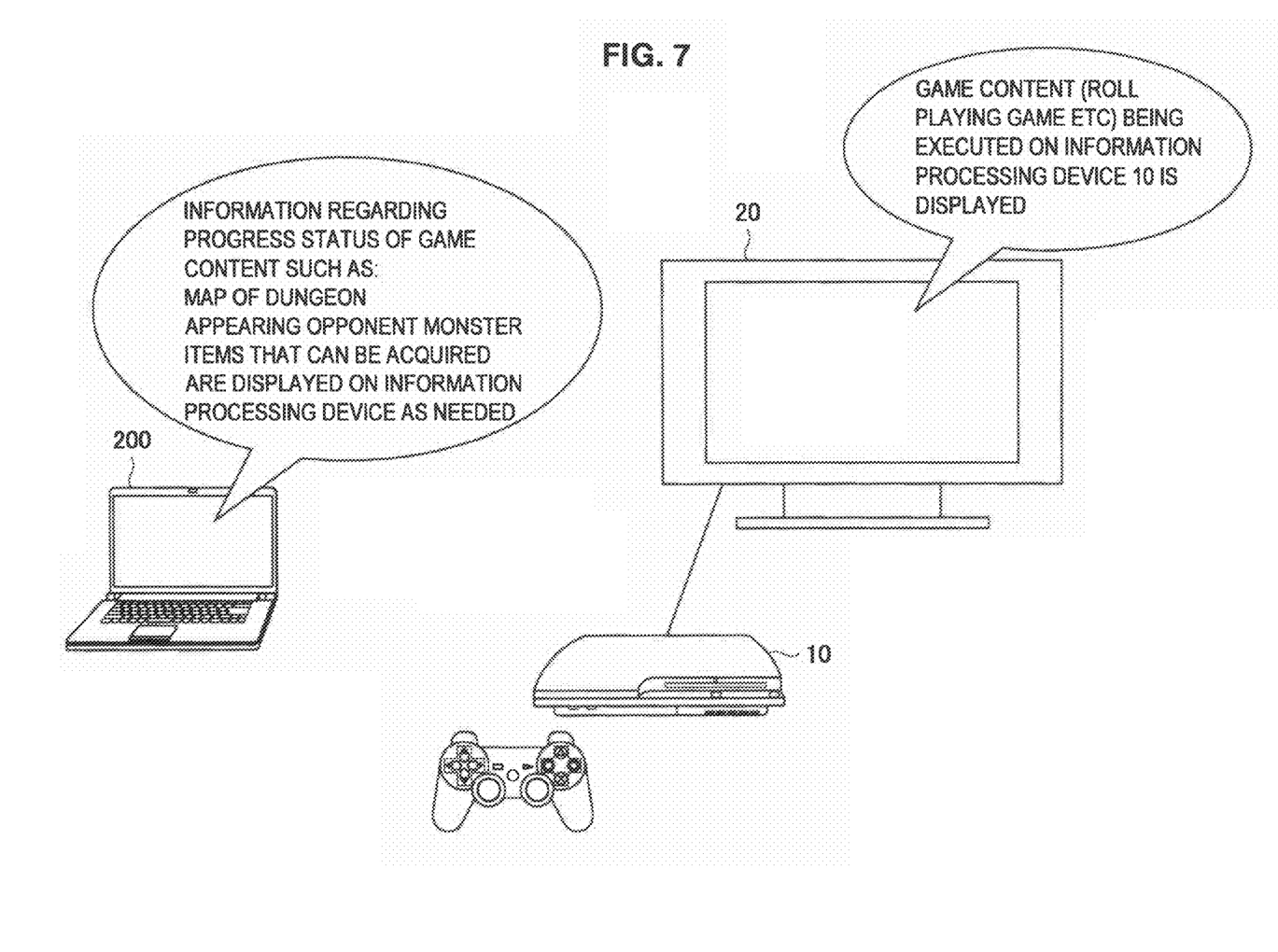
FIG. 7 is an explanatory view showing a screen display example.

FIG. 7 is an explanatory view showing a state in which the information corresponding to the execution state of the game content is displayed in the personal computer 200 when the game content is being executed on the information processing device 10. The information corresponding to the execution state of the game content is displayed in the personal computer 200, as necessary, in association with the execution state of the game content in the information processing device 10.

With the series of processes above, the content providing server 100 can extract the information corresponding to the execution state of the game content being executed on the information processing device 10 connected through the network 2, and can transmit the extracted information to the personal computer 200 associated with the information processing device 10. The information corresponding to the execution state of the game content being executed in the information processing device 10 is displayed in the personal computer 200 according to the above process. The information provided from the content providing server 100 to the personal computer 200 may be text data, or may be other binary data such as still image and audio, or moving image. In particular, a more specific walk-through method can be presented from the content providing server 100 to the user by providing the walk-through information of the game content from the content providing server 100 to the personal computer 200 in audio and moving image compared to the walk-through information only by characters.

The process of providing the information corresponding to the execution state of the game content executed on the information processing device 10 from the content providing server 100 to the personal computer 200 has been described using FIG. 6.

[1-5-3. Reflection on Game Content]

The content corresponding to the execution state of the game content being executed in the information processing device 10 can be transmitted to the personal computer 200 associated with the information processing device 10 by associating the information processing device 10 and the personal computer 200 with the content providing server 100 as described above, but the processing content in the personal computer 200 can also be reflected on the game content being executed on the information processing device 10 associated with the personal computer 200.

Figure 8:
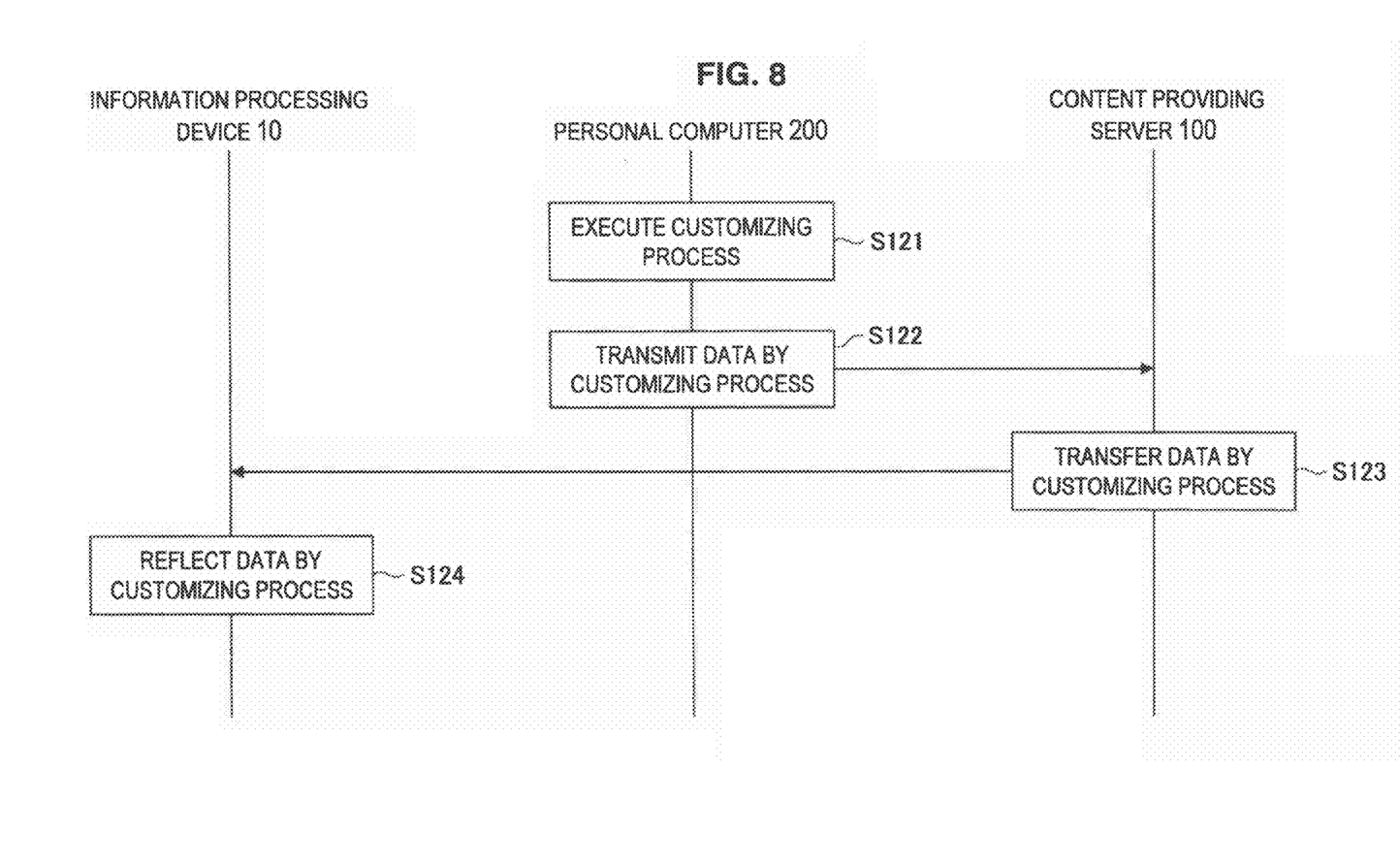
FIG. 8 is a flowchart showing the operation of the content providing system 1 according to one embodiment of the present invention.

For instance, games in which the appearance and the clothing of the character can be freely customized are known, where the user can customize the characters by operating the remote controller 40 in such games but customizing the characters by operating the remote controller 40 is often difficult and takes time. The easiness in customizing significantly improves if the customization of the character is carried out in the personal computer 200.

FIG. 8 is a flowchart showing the operation of the content providing system 1 according to one embodiment of the present invention, where a process of executing the operation on the game content executed in the information processing device 10 in the personal computer 200 and reflecting on the game content executed in the information processing device 10 is shown. The process shown in FIG. 8 is assumed to be performed after the information providing process from the content providing server 100 to the personal computer 200 shown in FIG. 6. The information for customizing the character that appears in the game content executed on the information processing device 10 are transmitted from the content providing server 100 to the personal computer 200.

The customizing process of the character that appears in the game content executed on the information processing device 10 is executed by the user in the personal computer 200 (step S121). After the customizing process of the character by the user is completed, the personal computer 200 transmits the data of the customized character to the content providing server 100 (step S122).

The content providing server 100 that received the data of the customized character from the personal computer 200 transfers to the information processing device 10 associated with the relevant personal computer 200 (step S123). The information processing device 10 transferred with the data of the customized character from the content providing server 100 reflects the data by the customizing process in the personal computer 200 on the character appearing in the game content being executed (step S124).

Therefore, the process in the personal computer 200 can be reflected on the game content executed in the information processing device 10 by executing the process on the game content executed on the information processing device 10 such as the customizing process of the character in the personal computer 200 logged into the content providing server 100 with the same login ID as the information processing device 10.

[1-6. Variant of Information Providing Process]

In the above described description, the content corresponding to the execution state of the game content being executed on the information processing device 10 is transmitted to the personal computer 200 associated with the information processing device 10 by associating the information processing device 10 and the personal computer 200 with the content providing server 100. In addition, the content providing server 100 can provide the content corresponding to the real time and date in addition to the execution state of the game content to the personal computer 200.

For instance, the content providing server 100 may provide information that differs depending on the real time and date the user is playing to the personal computer 200 even if the user is playing the same scene in the game content being executed on the information processing device 10. This is effective when desiring to provide a time limit to the information to be provided to the user. Consider a case where the game content being executed on the information processing device 10 is a golf content. When playing at a certain cup in a certain hole at a certain date and time, the information provided from the content providing server 100 to the personal computer 200 is the information on how to achieve the cup recommended the company that created the golf game, but the content providing server 100 may provide the personal computer 200 the information on how to achieve the cup recommended by the professional golfer when the relevant cup is played anew.

Furthermore, the content providing server 100 may provide information that differs depending on the virtual date and time in the game content the user is playing to the personal computer 200 even if the user is playing the same scene in the game content being executed on the information processing device 10.

Therefore, the multi-directional way of enjoying the game content can be presented to the user of the information processing device 10 by providing the contents that differ depending on the date and time played from the content providing server 100 to the personal computer 200 even if the user of the information processing device 10 is playing the same scene.

In the description made above, the content and the information are unconditionally transmitted from the content providing server 100 to the personal computer 200, but the content and the information provided from the content providing server 100 may be charged and the control unit 120 may check whether or not payment has been made. The control unit 120 may transmit the content and the information only to the personal computer 200 logged into the content providing server 100 with the login ID of the user who made the payment. The content providing system 1 according to one embodiment of the present invention may create a difference in the content and the information to provide from the content providing server 100 for the user who has made the payment and the user who has not made the payment.

<2. Conclusion>

According to one embodiment of the present invention described above, the information processing device 10 and the personal computer 200 are associated with the content providing server 100, and the information processing device 10 transmit the information regarding the execution state of the game content being executed to the content providing server 100, as necessary. The content providing server 100 receiving the execution state of the game content from the information processing device 10 sequentially extracts the content and the information corresponding to such execution state, and sequentially transmits the same to the personal computer 200 associated with the information processing device 10.

The personal computer 200 sequentially displays the content and the information transmitted from the content providing server 100 on the screen. Thus, the content providing server 100 can easily provide the information desired by the user by sequentially providing the content and the information corresponding to the execution state of the game content being executed on the information processing device 10.

The information that becomes a hint in proceeding the game content and the content for deepening the exchange between the users playing the game content are transmitted from the content providing server 100 as the content and the information corresponding to the execution state of the game content being executed on the information processing device 10. The multi-directional way of enjoying the game content can be presented to the user by transmitting the content and the information. The multi-directional way of enjoying the game content becomes possible if the content is provided to the device including the keyboard as the input device as with the personal computer 200, and but is generally not possible with only the information processing device 10 in which only a button for operating the game content is prepared in the remote controller 40.

In the embodiment described above, the content executed by the information processing device 10 is the game content, but the present invention is not limited thereto. The content executed by the information processing device 10 may be a content other than the game content such as the moving image content or the music content. The information processing device 10 may transmit the execution state of such contents, that is, the metadata on the moving image content and the music content being reproduced to the content providing server 100, and the content providing server 100 may extract the information regarding the metadata on the moving image content and the music content transmitted from the information processing device 10 and transmit the same to the personal computer 200.

It should be understood by those skilled in the art that various modifications, combinations, sub-combinations and alterations may occur depending on design requirements and other factors insofar as they are within the scope of the appended claims or the equivalents thereof.

Figure 9:
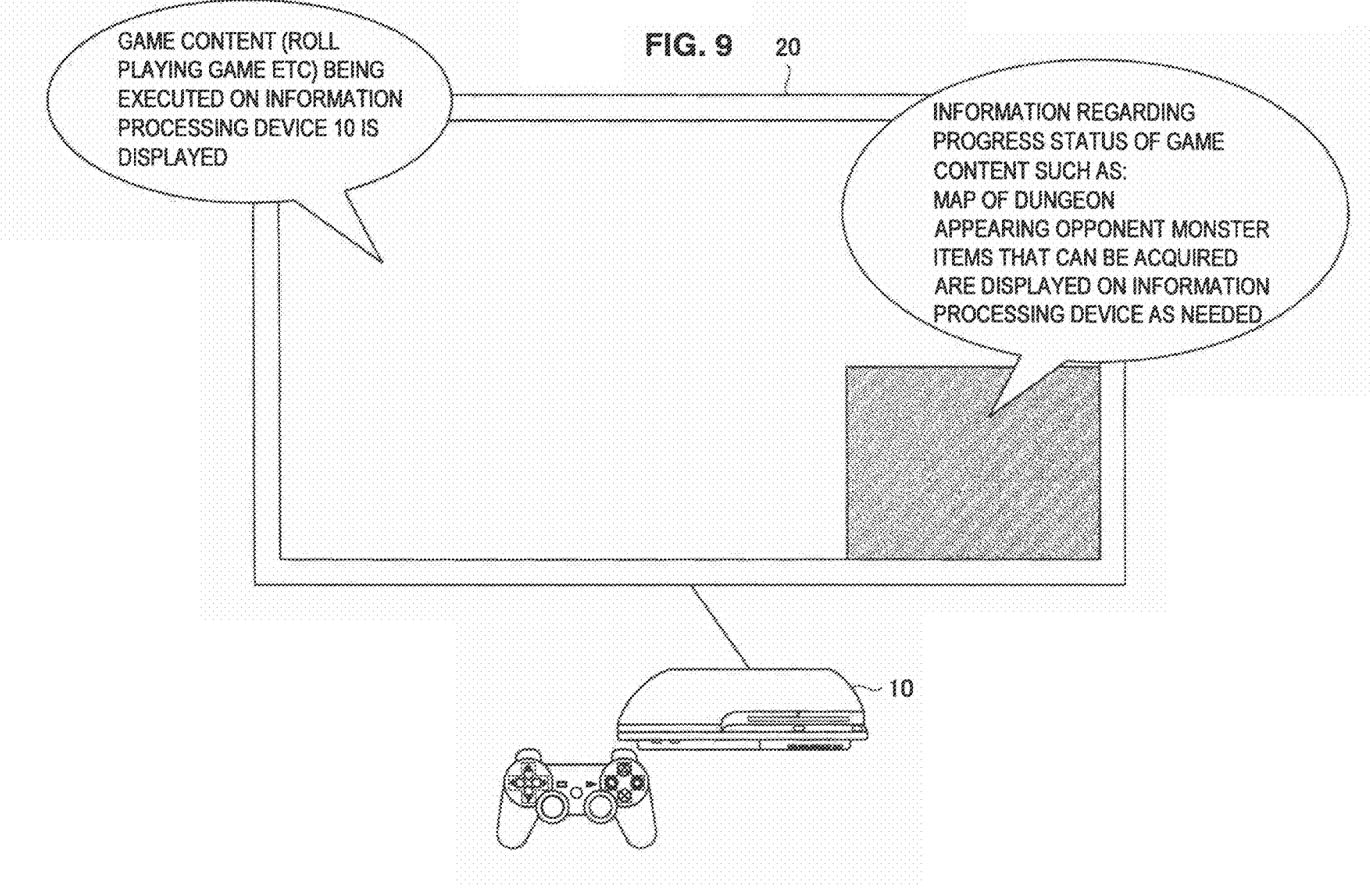
FIG. 9 is an explanatory view showing a screen display example.

For instance, in the embodiment described above, the information processing device 10 and the personal computer 200 are associated with the content providing server 100, and the content and the information corresponding to the execution state of the game content being executed on the information processing device 10 are received and displayed at the personal computer 200, but the present invention is not limited to such example. For instance, the information processing device 10 and the display device 20 may be associated with the content providing server 100, and the content and the information corresponding to the execution state of the game content being executed in the information processing device 10 may be received and displayed at the display device 20. FIG. 9 is an explanatory view showing a display example of when the content and the information corresponding to the execution state of the game content being executed in the information processing device 10 is received and displayed at the display device 20. The content and the information corresponding to the progress status of the game content can be easily checked while playing the game content being executed on the information processing device 10 by receiving and displaying the information transmitted from the content providing server 100 at the display device 20.

Furthermore, in the embodiment described above, the information processing device 10 and the personal computer 200 log into the content providing server 100 using the login ID so that the content providing server 100 associates the information processing device 10 and the personal computer 200 using the login ID, but the present invention is not limited to such example. For instance, the walk-through information and the like may be distributed from the content providing server 100 to the information processing device 10 by return, and the information processing device 10 that received the walk-through information may transfer such walk-through information and the like to the personal computer 200 connected to the same network (e.g., connected to the same router as the information processing device 10). The personal computer 200 sequentially reproduces the received information. That is, the content providing server 100 and the personal computer 200 do not directly exchange information on the network but the network connection and a predetermined setting are carried out between the information processing device 10 and the personal computer 200, so that the response from the personal computer 200 is also transmitted to the content providing server 100 through the information processing device 10. In addition, an e-mail with a guide of a special website described with the walk-through information and the like may be transmitted from the content providing server 100 to the personal computer 200, so that the user can browse through such web site.

The present application contains subject matter related to that disclosed in Japanese Priority Patent Application JP 2010-70756 filed in the Japan Patent Office on Mar. 25, 2010, the entire content of which is hereby incorporated by reference.

What is claimed is:

1. A content server comprising:
a receiver configured to receive, from a first device, metadata identifying an execution state of a content item executed in the first device connected through a network and identification information for identifying the first device through the network;
a memory configured to store a supplemental content item associated with the content item of the metadata identifying the execution state of the content item executed in the first device;
a content extractor configured to extract the supplemental content item based on the metadata identifying the execution state of the content item executed in the first device received by the receiver from the memory; and
a transmitter configured to transmits the supplemental content item extracted from the memory by the content extractor to a second device associated with the first device by the identification information through the network.

2. The content server according to claim 1,
wherein the content item executed in the first device is an interactive game, and
the content extractor extracts the supplemental content item corresponding to the execution state of the interactive game executed in the first device from the memory.

3. The content server according to claim 2,
wherein the content extractor extracts walk-through information of the interactive game corresponding to the execution state of the interactive game executed in the first device from the memory.

4. The content server according to claim 2,
wherein the content extractor extracts a bulletin board corresponding to the execution state of the interactive game executed in the first device from the memory.

5. The content server according to claim 1,
wherein the content extractor extracts the supplemental content item in view of real date and time when extracting the supplemental content item from the memory.

6. The content server according to claim 1,
wherein the receiver receives an input result with respect to the supplemental content item transmitted by the transmitter to the second device, and the transmitter transfers the input result received by the receiver from the second device to the first device.

7. The content server according to claim 1,
wherein the identification information received by the receiver is a user account.

8. The content server according to claim 7,
wherein the first device and the second device are associated using the user account.

9. The content server according to claim 1,
wherein the content extractor checks payment of a user corresponding to the identification information if the supplemental content item to extract is a charged content when extracting the supplemental content item from the memory.

10. The content server according to claim 1,
wherein the first device and the second device are of different device types.

11. The content server according to claim 1,
wherein the received metadata includes information that uniquely identifies a portion of an interactive game being executed in the first device.

12. A content providing system comprising:
a content server configured to provide a plurality of supplemental content items;
a first device configured to connect to the content server through a network by predetermined identification information; and
a second device configured to connect to the content server through the network by the predetermined identification information,
wherein the first device includes:
  circuitry configured to execute a content item; and
  a communication interface configured to transmit metadata identifying an execution state of the content item when executed by the circuitry to the content server,
the content server includes:
  a receiver configured to receive, from the first device, the metadata identifying the execution state of the content item executed in the first device and the predetermined identification information held in the first device through the network;
  a memory configured to store a supplemental content item associated with the content item of the metadata identifying the execution state of the content item executed in the first device;
  a content extractor configured to extract the supplemental content item based on the metadata identifying the execution state of the content item executed in the first device received by the receiver from the memory; and
  a transmitter configured to transmit the supplemental content item extracted from the memory by the content extractor to the second device having predetermined identification information same as the predetermined identification information received by the receiver from the first device through the network, and
the second device includes:
  a communication interface configured to receive the supplemental content item transmitted from the transmitter; and
  a display interface configured to output the supplemental content item received by the communication interface.

13. The content providing system according to claim 12,
wherein the first device executes an interactive game, and the second device includes a keyboard for an input device.

14. A method of a content providing apparatus for providing supplemental content, the method comprising:
receiving, from a first device, metadata identifying an execution state of a content item executed in the first device connected through a network and predetermined identification information held in the first device through the network;
extracting a supplemental content item based on the metadata identifying the execution state of the content item executed in the first device received in the receiving step from a memory which stores the supplemental content item associated with the content item of the metadata described with the execution state of the content item executed in the first device; and transmitting the supplemental content item extracted from the memory in the content extracting step to a second device having the predetermined identification information received from the first device in the receiving step through the network.

* * * * *